US006396572B1

(12) United States Patent
Chang et al.

(10) Patent No.: US 6,396,572 B1
(45) Date of Patent: *May 28, 2002

(54) APPARATUS FOR COMPARING TENSILE OR COMPRESSIVE STRESSES IMPOSED ON DIFFERENT PARTS OF OPTICAL FIBER

(75) Inventors: Chia-Chen Chang, Rockville; Erin Sahinci, Laurel; Waqar Mahmood, Columbia, all of MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/835,963

(22) Filed: Apr. 16, 2001

Related U.S. Application Data

(63) Continuation of application No. 09/803,711, filed on Mar. 9, 2001.

(51) Int. Cl.$^7$ .................................................. G01B 9/02
(52) U.S. Cl. ...................................... 356/35.5; 356/477
(58) Field of Search .............................. 356/35.5, 477, 356/478, 479; 250/227.18, 227.19, 227.27; 385/12

(56) References Cited

U.S. PATENT DOCUMENTS 6,137,565 A    10/2000  Ecke et al. ................. 356/35.5

FOREIGN PATENT DOCUMENTS

WO    WO-99/32911    *   7/1999

OTHER PUBLICATIONS

M. Volanthen, et al., "Measurement of Arbitrary Strain Profiles Within Fibre Grantings", Electronics Letters, vol. 32, No. 11, May 1996.
S. Huang, et al., "Phase–based Bragg Intragrating Distributed Strain Sensor", Applied Optics, vol. 35, No. 7, May 1996.
M. LeBlanc, et al., "Distributed Strain Measurement Based on a Fiber Bragg Grating and its Reflection Spectrum Analysis", Optics Letters, vol. 21, No. 17, Sep. 1996.
Masanori Matsuhara, et al., "Optical–Waveguide Filters: Synthesis", Journal of the Optical Society of America, vol. 65, No. 7, Jul. 1975.
G. S. Glaesemann, et al., "Design Methodology for the Mechanical Reliability of Optical", Optical Engineering, vol. 30, No. 6, Jun. 1991.
Marco Zimmol, et al., "Lifetime of Splices Under Tension", ECOC, 1998.
Telcodia Technologies, "Generic Requirements for Fusion Splice Protectors", Generic Requirements, GR–1380–CORE, Issue 1, 1994.

* cited by examiner

Primary Examiner—Samuel A. Turner
(74) Attorney, Agent, or Firm—Michael R. Cammarata

(57) ABSTRACT

The invention was originally developed to determine the strain-relief capability of a fusion splice protector as well as the compressive stress imparted to a fusion splice by the splice protector. The invention also permits performance and comparative analyses of splice protectors as well as any package in which the optical fiber is at least partially disposed. To those ends a fiber Bragg grating (FBG) is axially arranged relative to the package such that a free or reference section of the FBG protrudes from the package while a shielded section lies within the package. Broadband light is supplied to the FBG which reflects certain wavelengths that are measured by an optical spectrum analyzer. The FBG reflected spectra will be split into two peaks as the reference and shielded sections experience different amounts or types of stress thereby providing a powerful analysis tool. A wavelength shift in the reflected spectra reveals the amount of stress experienced by the reference and free sections and permits a qualitative and quantitative analysis of the stress applied by the package and the package's ability to protect fiber from stress (e.g. such as that imposed by a tension pull test). Measurements may be made after a variety of conditions are changed such as splice protector curing, axial tension application, axial tension release, time, and age accelerating environments. Comparative studies and various other calculations may also be performed to evaluate different packages.

4 Claims, 18 Drawing Sheets

APPARATUS FOR COMPARING TENSILE OR COMPRESSIVE STRESSES IMPOSED ON DIFFERENT PARTS OF OPTICAL FIBER

This application is a continuation of U.S. patent application Ser. No. 09/803,711 filed on Mar. 9, 2001, still pending the disclosure of which is hereby incorporated by reference.

BACKGROUND OF THE INVENTION

1. Field of Invention

The invention generally relates to an apparatus, system and method for measuring tensile and/or compressive stresses experienced by an optical fiber.

2. Description of Related Art

Using an in-fiber Bragg grating to measure temperature and strain is a conventional and widely used technique. Such techniques take advantage of periodicity changes in the grating that are caused by temperature and/or strain changes. For example, an increased temperature or axial tension expands the period between grating etchings and causes a corresponding change in the wavelength(s) reflected by the grating.

A recent example of such a system is described in Ecke et al. (U.S. Pat. No. 6,137,565) which uses a plurality of fiber Bragg gratings to accurately determine the absolute physical state (temperature or stain) in an optical fiber.

As is known in the art, sections of optical fiber may be spliced together using an electric arc or other energy source that fuses the respective fiber ends together. Such a splice is commonly referred to as a "fusion splice." To test the structural integrity of such fusion splices, the fused fibers are routinely subjected to a "pull test" in which an axial tension is applied to the fused fibers. Indeed, widely-accepted Bellcore standards require such a pull test (see, for example, Generic Requirements For Fusion Splice Protectors GR-1380-CORE, Issue 1, May 1994). This pull test utilizes conventional tensile testing machines which ramp up the tensile load to a predetermined set point or until failure (optical break or optical loss increase sufficient to declare an effective optical break).

Once a fusion splice is formed, the portion of the fiber that was stripped of its protective layers to form the splice should be protected to prevent environmental degradation of the optical fiber. Such environmental degradation is a widely-studied problem and includes water molecules attacking the chemical bonds in the optical fiber.

Various forms of splice protectors exist including coating the bare fiber with a protective material such as a ultra-violet cured acrylate material. Generally speaking, a splice protector is a mechanical device or fiber coating that provides at least environmental protection to a single fiber or a set of fibers. Splice protectors may also provide mechanical protection to the fusion splice such as inhibiting bending and increasing the tensile strength. As is also known in the art, bending optical fiber affects the useful life of the fiber and exceeding a minimum bend radius can irreparably damage the fiber.

To provide a measure of environmental and mechanical protection, various other forms of splice protectors have been invented. These splice protectors come in various forms such as a hot-melt adhesive tube into which the spliced fibers are threaded. The hot-melt adhesive tube may also be situated inside a heat-shrink tube alone or together with a strength member such as a metal rod. When heat cured, the hot-melt adhesive bonds to the fiber and provides a hermetic seal while the heat-shrink tube shrinks down and encapsulates the fusion splice. In the process, the fusion splice and optical fiber within the splice protector is subjected to a compressive stress.

To date, no method or technique exists for accurately measuring this stress and comparing the stress applied to the fiber inside the splice protector to the stress outside the splice protector.

Other types of splice protectors include clam-shell protectors composed of two hinged plates that may be provided with grooves that accept the fiber and encapsulating protectors which includes a splice holder into which is poured a potting compound. Such clam-shell and encapsulating protectors may also stress the fibers to a degree heretofore unknown.

SUMMARY OF THE INVENTION

The invention includes an apparatus for comparing tensile or compressive stresses imposed on different parts of an optical fiber by a package, comprising: a fiber Bragg grating provided in the optical fiber; a free section of said fiber Bragg grating, said free section protruding from the package; shielded section of said fiber Bragg grating, said shielded section being shielded by the package, wherein said free section of said fiber Bragg grating provides a measurement reference with respect to said shielded section of said fiber Bragg grating.

In this apparatus, the shielded section of said fiber Bragg grating may be arranged relative to the package such that said shielded section experiences approximately half of a stress profile within the package.

In this apparatus, the fiber Bragg grating may have a length sufficient to and is axially arranged relative to the package such that said shielded section of said fiber Bragg grating extends approximately halfway into the package.

The invention also includes a system for measuring stress of an optical fiber at least partially disposed in a package, comprising: a fiber Bragg grating provided in the optical fiber; a free section of said fiber Bragg grating protruding from the package; a shielded section said fiber Bragg grating being shielded by the package; a light source optically coupled to said fiber Bragg grating and providing light to said fiber Bragg grating; a measuring device optically coupled to said fiber Bragg grating, said measuring device measuring light received from said free section and said shielded section of said fiber Bragg grating, wherein the measurements made by said measuring device are indicative of stress experienced by the optical fiber.

The measuring device may be an optical spectrum analyzer optically coupled to said fiber Bragg grating, said optical spectrum analyzer receiving light from said free section and said shielded section of said fiber Bragg grating. The system may also include a display device operatively connected to said optical spectrum analyzer, said display device displaying an optical spectrum of the received light.

The inventive system may also include a calculation device operatively connected to said measuring device; said measuring device measuring intensity or phase at a plurality of different wavelengths; said calculation device calculating stress experienced by the optical fiber based on the measurements made by said measuring device.

The calculation device may also calculate a normalized modulus, normalized wavelength shift based on the measurements made by said measuring device.

In an alternative measuring system, a reference grating may be provided on a reference arm of a Michelson interferometer; said fiber Bragg grating being provided on a test arm of the Michelson interferometer. A first fiber tensioner may be provided on the reference arm and used to adjust an optical path length of the reference arm. In this system, the measuring device measures interference fringes caused by interfering wavelengths reflected by said fiber Bragg grating and said reference grating.

The invention further includes a method of analyzing stress of an optical fiber at least partially disposed in a package with a fiber Bragg grating provided in the optical fiber, comprising: arranging the fiber Bragg grating in the package such that the fiber Bragg grating has a free section protruding from the package and a shielded section shielded by the package; supplying light to the free and shielded sections of the fiber Bragg grating; receiving light processed by the free and shielded sections of the fiber Bragg grating; and measuring the received light, wherein the measurements made by said measuring step are indicative of stress experienced by the optical fiber.

The measurements may be displayed or subjected to calculations. For example, the invention may calculate stress experienced by the optical fiber, a normalized modulus, and a normalized wavelength shift based on the measurements made by said measuring step.

The inventive method may also change a condition; and repeat the measuring step after changing the condition. Comparisons of the measurements may then be made before and after the condition is changed.

The types of conditions that may be changed by the invention vary widely. For example, if the package is a splice protector, the condition may be curing of the splice protector. The condition may also be applying axial tension or releasing applied axial tension. Other changeable conditions include time and an environment in which at least at portion of the optical fiber is situated. In this way, measurements may be made over widely varying conditions to fully evaluate the stress applied by a package on the optical fiber at each of the these conditions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not necessarily require a direct physical connection.

The invention was originally developed to determine the strain-relief capability of a splice protector as well as the compressive stress imparted to a fusion splice by the splice protector. To that end the apparatus shown in FIG. 1 was developed. As the inventors quickly realized, the invention is also an excellent tool for comparing the performance of splice protectors over time and to compare the performance of different splice protectors.

Moreover, optical fiber may experience compressive and/or tensile stresses from a variety of packages, placements and utilizations. For example, many package designs utilize optical fiber as a lead, pigtail, or other part of the package design. The invention also finds utility in measuring these stresses and providing a tool for comparing the performance of different package designs. Although the term "splice protector" or "sleeve" is used in this application extensively, it is to be understood that these terms are illustrative and non-limiting as the invention may also apply to any package or other apparatus that imposes stress on the fiber.

Figure 1:
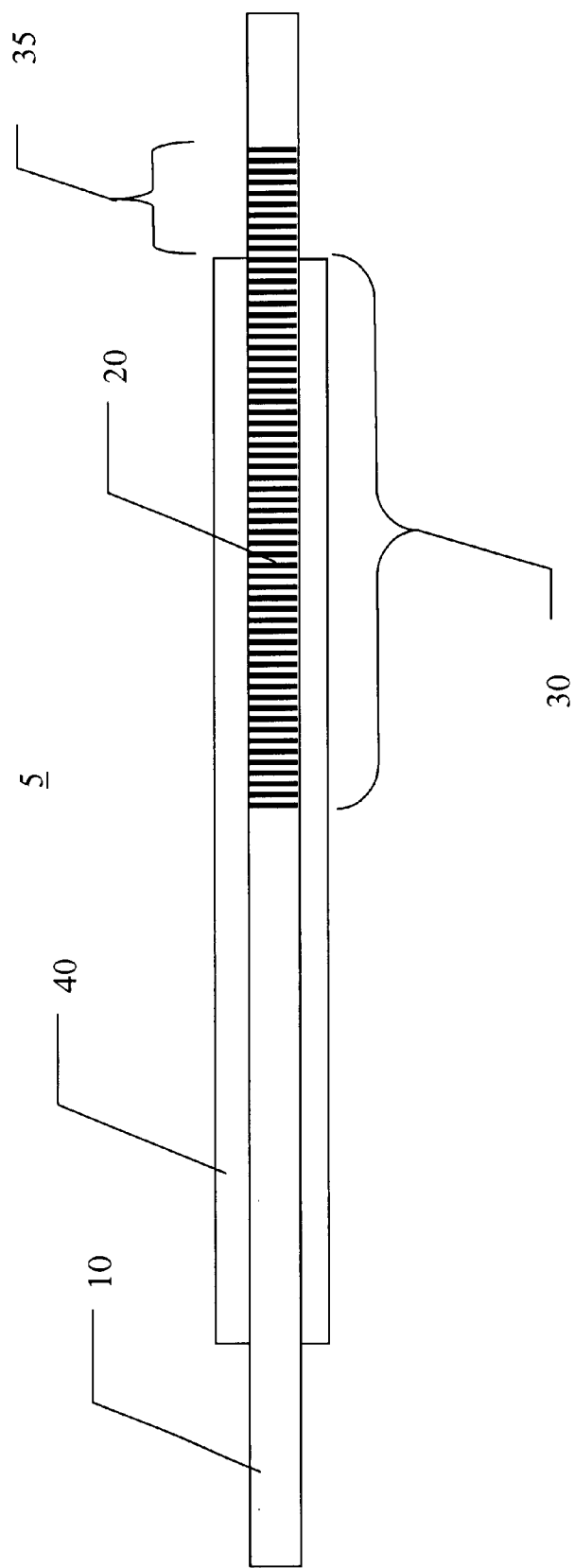
FIG. 1 is a cross-sectional diagram illustrating the inventive optical fiber strain measuring apparatus for measuring stresses imposed by a fusion splice protector.

As shown in FIG. 1, the inventive apparatus 5 includes a length of optical fiber 10. A Bragg grating 20 is provided along a portion of the optical fiber 10 using standard techniques such as ultraviolet etching.

Significantly, the Bragg grating 20 has a "free" or reference section 35 that protrudes from the splice protector 40 and a "shielded" section 30 within the splice protector 40. In other words, 20 the Bragg grating 20 is partially disposed within the splice protector 40 so that part (reference section 35) of the Bragg grating 20 is outside the splice protector 40 to act as a reference or basis of comparison and part (shielded section 30) is inside the splice protector 40. By disposing the Bragg grating 20 relative to the splice protector 40 (or other package or apparatus imposing stress on the fiber 10) in this fashion, the invention permits a comparative, distributed sensing technique.

The Bragg grating 20 is preferably disposed in the splice protector 40 such that the shielded section 30 of Bragg grating 20 extends halfway into the splice protector 40. While other arrangements are possible, extending the Bragg grating 20 past the half-way point complicates the analysis and data interpretation. It is generally assumed that the stress profile imposed by the splice protector 40 is longitudinally symmetric in that the "left" half imposes substantially the same strain, profile on the fiber 10 as the "right" half. If the fiber Bragg grating 20 is disposed less than the half-way point, then a full distributed measurement of the splice protector 40's effect on the fiber 10 will not occur.

Figure 2:
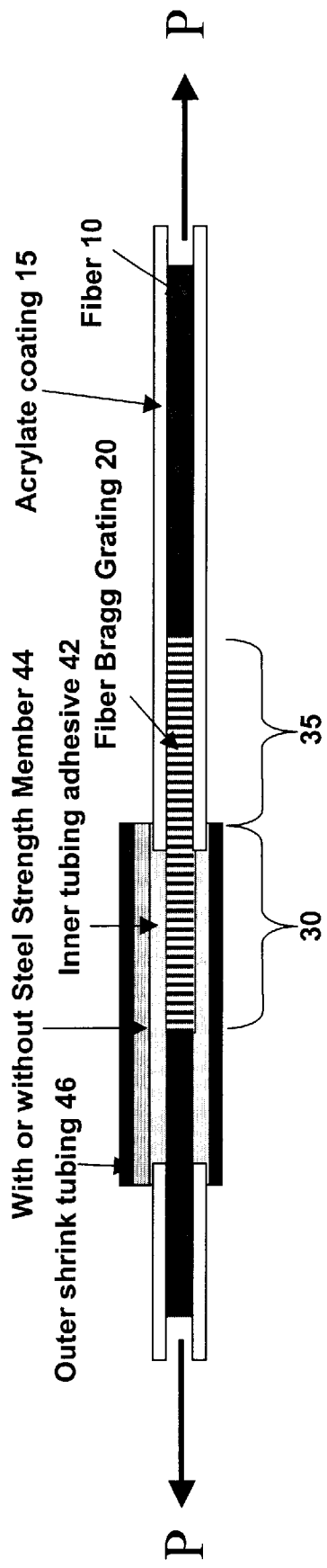
FIG. 2 is a more detailed cross-sectional diagram illustrating the inventive optical fiber strain measuring apparatus measuring stresses imposed by a particular type of fusion splice protector.

FIG. 2 illustrates details of a typical and conventional splice protector including an inner tubing adhesive (e.g. made of hot-melt polymer) to hermetically seal a fusion splice; a steel strength member 44 (e.g. a steel or other rigid member that may or may not be used to provide a measure of structural rigidity); and an outer shrink tubing 46 (e.g. heat-shrink tubing).

FIG. 2 also shows details of typical optical fibers including an acrylate coating 15 that is removed prior to the fusion splice and which is also removed prior to inventive testing in order to more accurately simulate the stresses imposed on a fusion splice by a splice protector. It is not necessary for the optical fiber 10 to contain a fusion splice but it may. One of the inventive purposes is to measure the stresses applied on a fusion splice by a splice protector 40. To increase the accuracy of this measurement, the environment experienced by the fusion splice is simulated. For example, to simulate the structural environment experienced by a fusion splice encapsulated by a splice protector 40, the acrylate coating 15 or equivalent is preferably removed as this coating is routinely removed prior to fusion splicing.

Figure 3A:
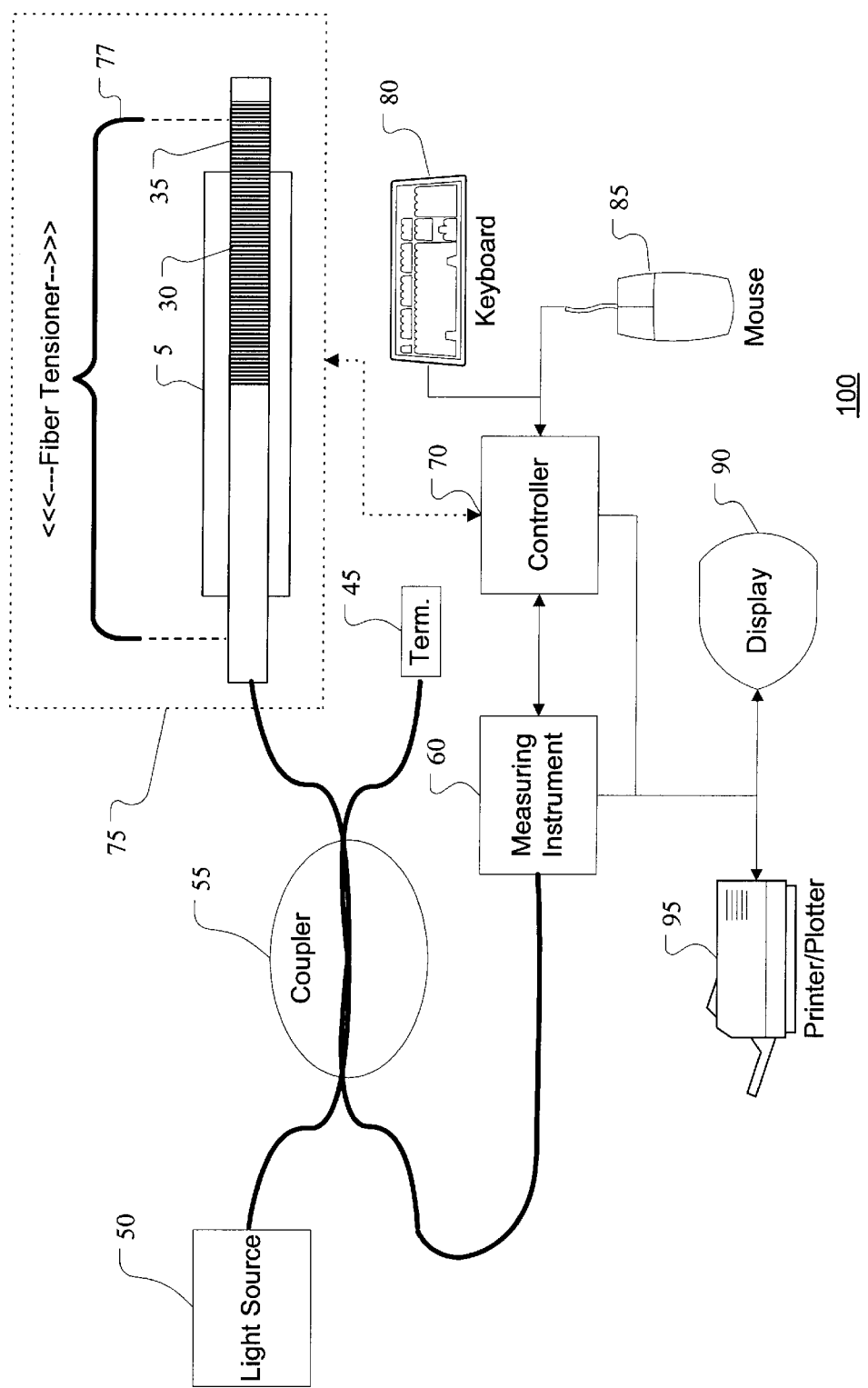
FIG. 3a is a system for measuring optical fiber strain according to the invention.
Figure 3B:
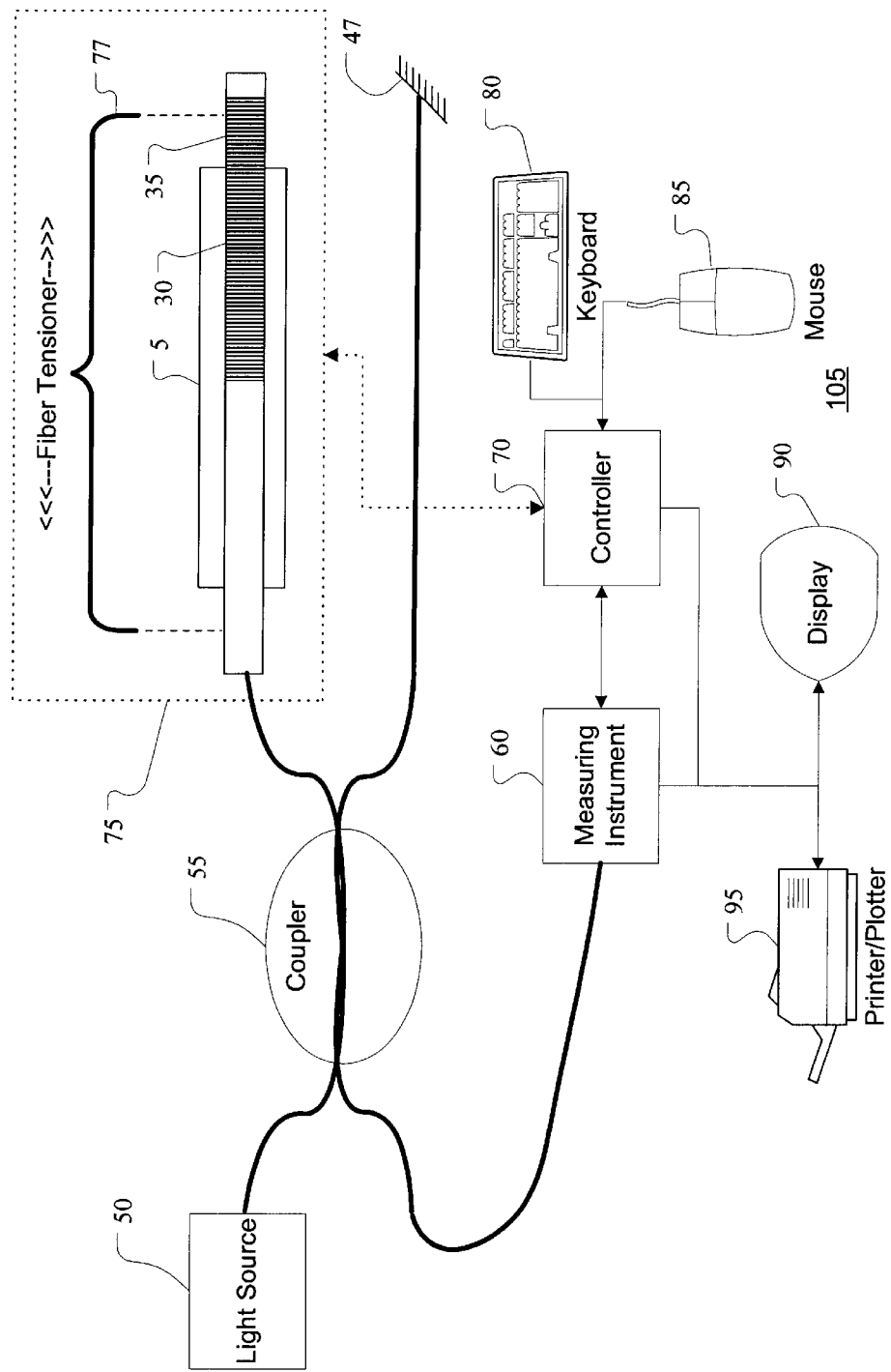
FIG. 3b is an alternative system for measuring optical fiber strain according to the invention.
Figure 3C:
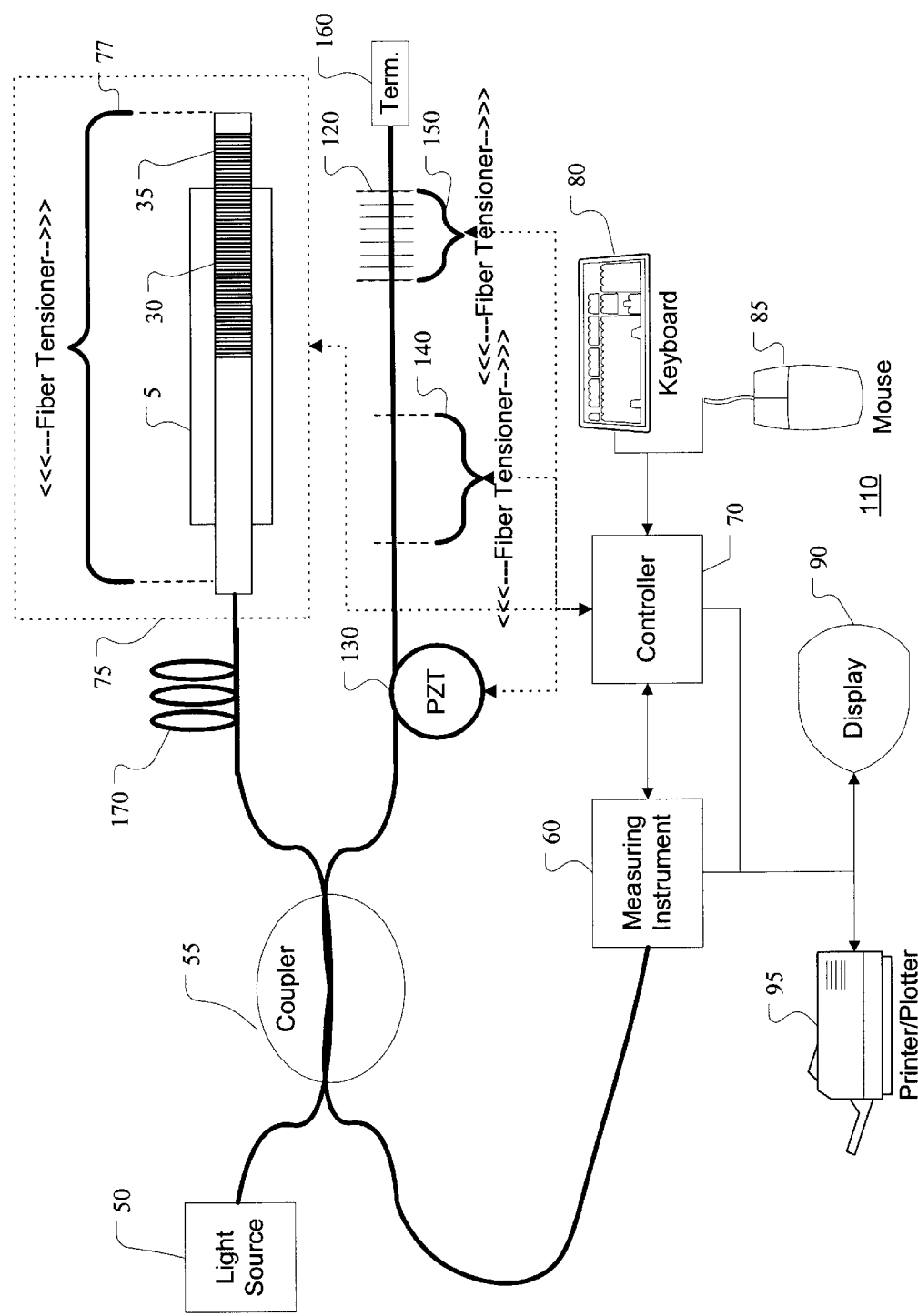
FIG. 3c is an other alternative system for measuring optical fiber strain according to the invention.

In addition, FIG. 2 shows the axial tension load P that may be applied by a fiber tensioner in a so-called pull test. FIGS. 3a–c illustrate such a fiber tensioner 77 which may be manually controlled or actuated by controller 70.

FIG. 3a illustrates the preferred inventive system 100 which includes a light source 50 providing light to strain measuring apparatus 5 via coupler 55. The light source 50 may be constructed in a variety of fashions such as ASE (amplified spontaneous emission) from an EDFA (erbium-doped fiber amplifier), a superluminescent diode, or LED (light emitting diode such as an ELED (edge light emitting diode) and SLED (surface light emitting diode).

The light source 50 is preferably a broadband source in FIG. 3a. The term "broadband" is a relative term as the spectrum of the light supplied by light source 50 need only encompass the expected wavelengths that could be reflected by the fiber Bragg grating 20.

A portion of the broadband light exits coupler 55 and is preferably terminated by terminator 45 which may be an angled fiber cut, terminating gel or other conventional device or technique to terminate the light.

The coupler 55 is another conventional element which may be, for example, a 3 dB coupler. It is to be understood that a coupler 55 is not an essential element as there are a variety of ways to route light signals such as a circulator or bulk optics beam splitter. Also, a 3 dB coupler is but one non-limiting example as the insertion loss and, indeed, the means of providing light from light source 50 to the apparatus 5 and measuring instrument 60 may vary and still be within the scope of the invention.

The fiber Bragg grating (FBG) 20 will reflect certain spectra of the broadband light supplied by light source 50. The reflected FBG spectra pass through coupler 55 and are thereby routed to measuring device 60. For reasons discussed below in more detail, a chirped grating may be preferable.

Although the preferred embodiment of FIG. 3a measures reflected spectra it is possible to measure transmitted spectra. In such a case, the coupler 55 would not be necessary and the measuring device 60 could be optically coupled to the output of the apparatus 5. In this non-preferred alternative, the transmitted or forward spectrum may be subtracted from the broadband source 50 spectrum. While it is possible to operate in this fashion, one must be careful because the forward spectrum may lossier than the subtraction expression.

Measuring device 60 may be constructed in a variety of fashions including a conventional diffraction-grating-based optical spectrum analyzer or wavelength scanning using a tunable Fabry-Perot filter or acousto-optic filter.

The measuring device 60 of FIG. 3a measures intensity at a plurality of different wavelengths and may generate data sufficient to drive a displayed graph of measured intensity versus wavelength and feed such information to display device 90 directly. The display device 90 may be part of the measuring device 90 or separately provided as shown. In another alternative, the measuring device 60 may feed measurement results to a controller 70.

FIG. 3b is alternative system 105 according to the invention. Since many of the elements are the same as FIG. 3a only the differences will be described. FIG. 3b is a phase measuring system as opposed to the intensity measuring system of FIG. 3a. To measure phase a Michelson Interferometer arrangement is employed in which roughly path-matched arms are utilized such that the reflected spectra from the Bragg grating apparatus 5 in the first arm will interfere with the spectra reflected by mirror 47 in the second arm. The measuring instrument 60 of FIG. 3b measures phase as a function of wavelength $\phi(\lambda)$.

The light source 50 in the FIG. 3b embodiment may be, for example, a tunable laser or EDFA. A tunable laser is generally preferred in system 105 of FIG. 3b as it provides a long coherence length and fine resolution needed to make precise phase measurements particularly because of the roughly path-matched arms and length of the grating 20 in FBG apparatus 5. If a tunable laser is used as light source 50, then the controller 70 will sweep the output wavelength of the tunable laser over the expected FBG apparatus 5 reflection wavelengths so that interference will occur between the wavelengths reflected by mirror 47 and the wavelengths reflected by FBG apparatus 5.

A tunable laser may also be used in system 100 shown in FIG. 3a, but a broadband source is preferred in system 100 as it is cheaper and does not require the controlling as in the tunable laser option. One requirement for using a tunable laser as light source 50 is that the scanning speed should be much faster than the variation of measured strain field experienced by the tested fiber 10 in order to capture these variations. A broadband source, on the other hand, provides a band of light wavelengths available for reflection by the FBG apparatus 5 according to the instantaneous strain and thus ensures no time-lag for each portion of the reflected (or transmitted) Bragg spectrum.

FIG. 3c is another alternative system 110 according to the invention. Again, since many of the elements are the same of FIG. 3a only the differences will be described. Like the system 105 of Fib 3b, the system 110 of FIG. 3c utilizes a Michelson interferometer arrangement in which the first arm contains the Bragg grating apparatus 5 of the invention. This first arm may be called a test arm as opposed the second or reference arm which contains reference grating 120 preferably made with a narrow bandwidth fiber Bragg grating. A length of fiber 170 may be needed to roughly match the path lengths test and reference arms. The path length of the reference arm may be further matched to the path length of the test arm by the fiber tensioner 140 and modulated by the piezoelectric transducer (PZT) 130 over a small range to observe the interference fringes. The reference grating 120 is strained by fiber tensioner 150 to maximize the interference fringes. Controller 70 may control the fiber tensioners 140, 150 and the PZT 130.

In other words, the system 110 of FIG. 3c uses fiber tensioner 140 to probe (interrogate) different positions of the FBG 5 grating 20. The wavelengths reflected by the reference grating 120 may be tuned by fiber tensioner 150. The PZT 170 is used as a scanner to vary the path length and produce interference fringes between the wavelengths reflected by reference grating 120 and grating 20 in FBG 5. The visibility of the interference fringes will improve when the two arms have a path length that is almost equal and that is why fiber tensioners are used to obtain this path match. Once the reference arm is path-matched to a specific position on the grating 20 of FBG 5, the PZT 130 is modulated. Fringe resolution improves when the reference grating 20 is tuned until the Bragg wavelength is the same as the one at the position of the tested grating (grating 20 in FBG apparatus 5). By iterating this method point-by-point the Bragg wavelength versus grating position (z) will be resolved.

Some of the components of system 110 are known and further described in Volanthen, M. "Measurement of Arbitrary Strain Profile within fiber Gratings," Electronics Letters, Vol. 32, pp. 1028–1029, 1996 (May 23, 1996) which is hereby incorporated by reference. This invention applies components of the system described in this publication to the inventive fiber Bragg apparatus 5. As further explained the Volanthen, the strain profile of the interrogated grating may be sequentially interrogated using low coherence reflectometry in which the z axis position of the grating being interrogated may be selected by balancing the path lengths of the test and reference arms.

The measuring apparatus 60 used by FIG. 3c may simply be a photodetector such as a transimpedance receiver that detects the peak to peak amplitude of the fringes. These peak to peak amplitudes may also be converted to a DC level to allow measurement by a voltmeter. These measurements may then be fed to the controller 70 and/or output device (e.g. printer/plotter 95 or display 90).

In general, the type of measuring instrument 60 employed may depend upon the type or dynamic nature of the testing to be conducted. An OSA may be employed to advantage if the tested portion of fiber 10 (e.g. such as the tested splice protector 40) usually is subjected to a static or quasi-static perturbation. For dynamic perturbations (e.g. such as optical fiber packaging as a fiber-based sensing transducer or used as a dithering portion modulated in a PZT cylinder as shown in FIG. 3c), a faster scanning speed instrument such as scanning Fabry-Perot filter or acoustic optic filter may be employed to advantage.

The systems 100, 105 and 110 respectively shown in FIGS. 3a–c are exemplary and non-limiting applications of the inventive FBG apparatus 5. In other words, the FBG apparatus may be incorporated into other systems to gather measurements indicative of the distributed strain profile experienced by the shielded section 30 and free section 35 of the FBG apparatus 5.

Controller 70 may be constructed in a variety of fashions utilizing electronic components, optical components, computer hardware, firmware, software or a combination thereof. Typical examples in the electronic domain include FPGAs (field programmable gate arrays), ASICs (application specific integrated circuits), and microprocessors such as a general purpose microprocessor programmed with inventive methods as outlined below. Due to the low cost, high availability, and ease of programming a personal computer is generally preferred to implement controller 70. Controller 70 also preferably includes a memory unit to store the measurement data provided by measuring device 60 for further calculations and analysis.

FIGS. 3a–c also illustrate an optional environmental chamber 75. Such environmental chambers 75 are well-known devices and are typically used to conduct an age-accelerated test. In other words, environmental chamber may change internal environmental conditions such as temperature, humidity, pressure, etc. in order to subject the sample placed therein to environmental stress(es). The controller 70 may control the environmental chamber 75 as well as the fiber tensioner 77 in order to subject the FBG apparatus 5 to various conditions as further explained below in reference to the flowchart of FIG. 16.

Chamber 75 is also being used to designate a splice protector curing device. As mentioned above, many splice protectors 40 need to be cured (e.g. by applying heat, pressure and/or radiation). One of the functions that may be performed by the invention is measuring the stress applied by the splice protector 40 before and after and even during splice protector 40 curing.

The measuring device 60 measures the reflected FBG 20 spectra (or, for example, the phase of interfering FBG spectra as in FIG. 3b). The measurements are preferably made at various conditions experienced by the optical fiber 10. These conditions include but are not limited to: before splice protector 40 curing; during splice protector 40 curing; after splice protector 40 curing; during axial tension load P application; after tension load P is released; time; age accelerating environments; and other conditions and combinations of conditions.

The measurements taken by measuring device 60 are quite revealing and provide heretofore unavailable and extremely valuable information. By providing both a free or reference section 35 outside of the splice protector 40 and a shielded section 30 inside the splice protector 40, the splice protector's effect on the optical fiber 10 may for the very first time be quantitatively measured qualitatively analyzed. In general, the arrangement of the free 30 and reference 35 sections may be used to quantitatively and qualitatively analyze the stresses applied to an optical fiber by any package, placement or utilization of fiber that imposes stress on the fiber and in which a boundary exists such that the different sections of the fiber are subjected to different longitudinal stress profiles. More specifically, each of the free section 35 and the shielded section 30 perform distributed sensing the results of which are measured by the measuring device 60. In other words, the free section 35 and shielded section 30 each serve as a distributed sensor reflecting respective wavelengths that are measured by the measuring device 60. Since each section 30, 35 may experience a different stress the spectra reflected by each section 30, 35 may differ. These differing spectra provide a basis of comparison that is exploited by the invention.

Figure 4:
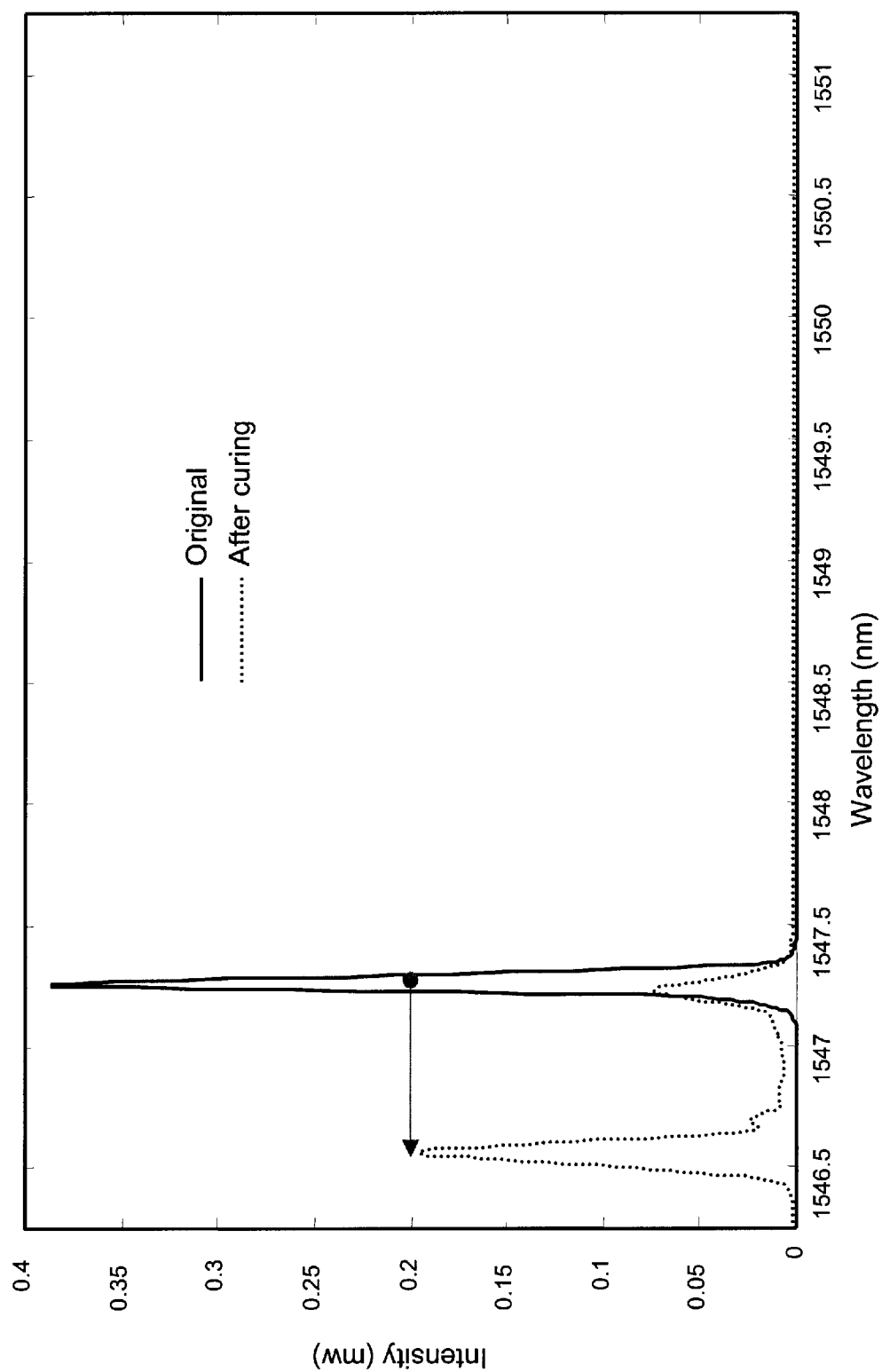
FIG. 4 is a composite graph of intensity versus wavelength illustrating measurements made by the inventive system before and after the fusion splice protector is cured.

FIG. 4 shows one such measurement in the form of a graph of intensity versus wavelength. The original measurement was taken (solid line as indicated by the key of FIG. 4) before the splice protector 40 was cured such as before the fiber 10 is threaded into the splice protector 40 or when the splice protector 40 is hanging loosely around or otherwise imposing minimal stress on the fiber 10. The splice protector 40 was then cured and another measurement taken (the dotted line as indicated by the key of FIG. 4). Curing the splice protector 40 involves, for example, heating the splice protector 40 to melt the adhesive sleeve 42 and shrink the tubing 46 but could also include affixing a clam shell type protector 40 or otherwise applying a splice protector 40 to the optical fiber 10.

As can be seen in FIG. 4, curing the splice protector splits the reflected FBG spectrum into two peaks including a peak from the free section 35 that is similar in wavelength to the original peak wavelength. The shielded section 30 produces a wavelength shifted peak (indicated by the arrow in FIG. 4). In this case, the wavelength shifted peak is a negative peak shift indicating a compressive stress being applied to the fiber 10 by the cured splice protector 40. Quantitatively, the shielded section 30 negative wavelength peak shift is 0.6 nm.

Figure 5:
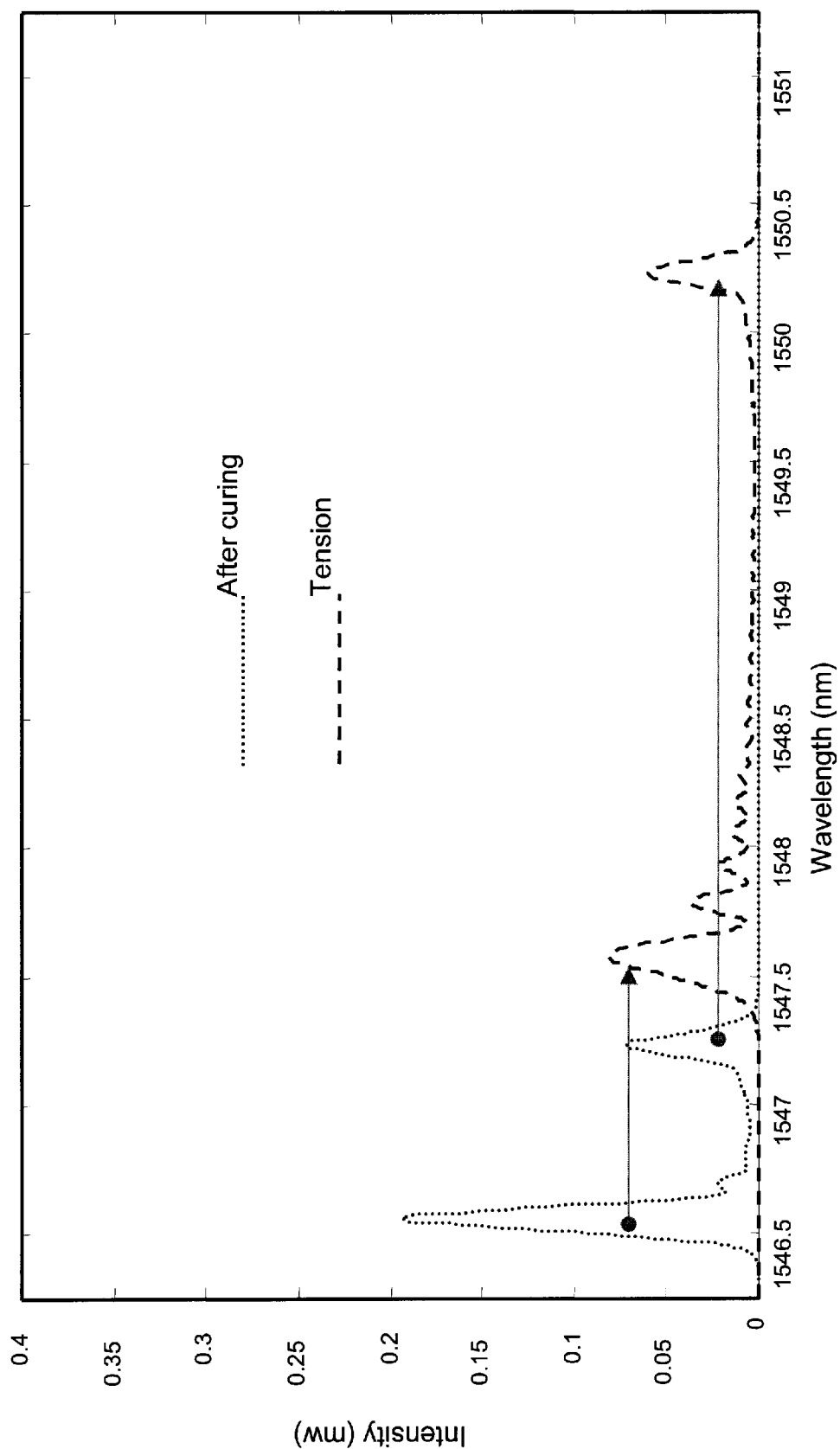
FIG. 5 is a composite graph of intensity versus wavelength illustrating measurements made by the inventive system after the fusion splice protector is cured and while axial tension is being applied to the fiber.

FIG. 5 illustrates a graph of intensity versus wavelength measurements for another type of condition. Namely, FIG. 5 illustrates the effect on the fiber 10 caused by a tension pull test. The fiber tensioner illustrated in FIG. 3 may be used to apply an axial tension to the fiber 10 to simulate a fusion splice tension pull test. By comparing the split peaks it can be seen that the axial tension load causes the free section 35 of grating 20 to have 3.4 times the peak wavelength shift as compared to the shift experienced by the shielded section 30. Here, the peak wavelength shift is positive indicating that the fiber 10 is in tension. FIG. 5 shows split peaks for both tension and after curing conditions because the free section 35 is experiencing a different stress than the shielded section 30 for each of these conditions.

Figure 6:
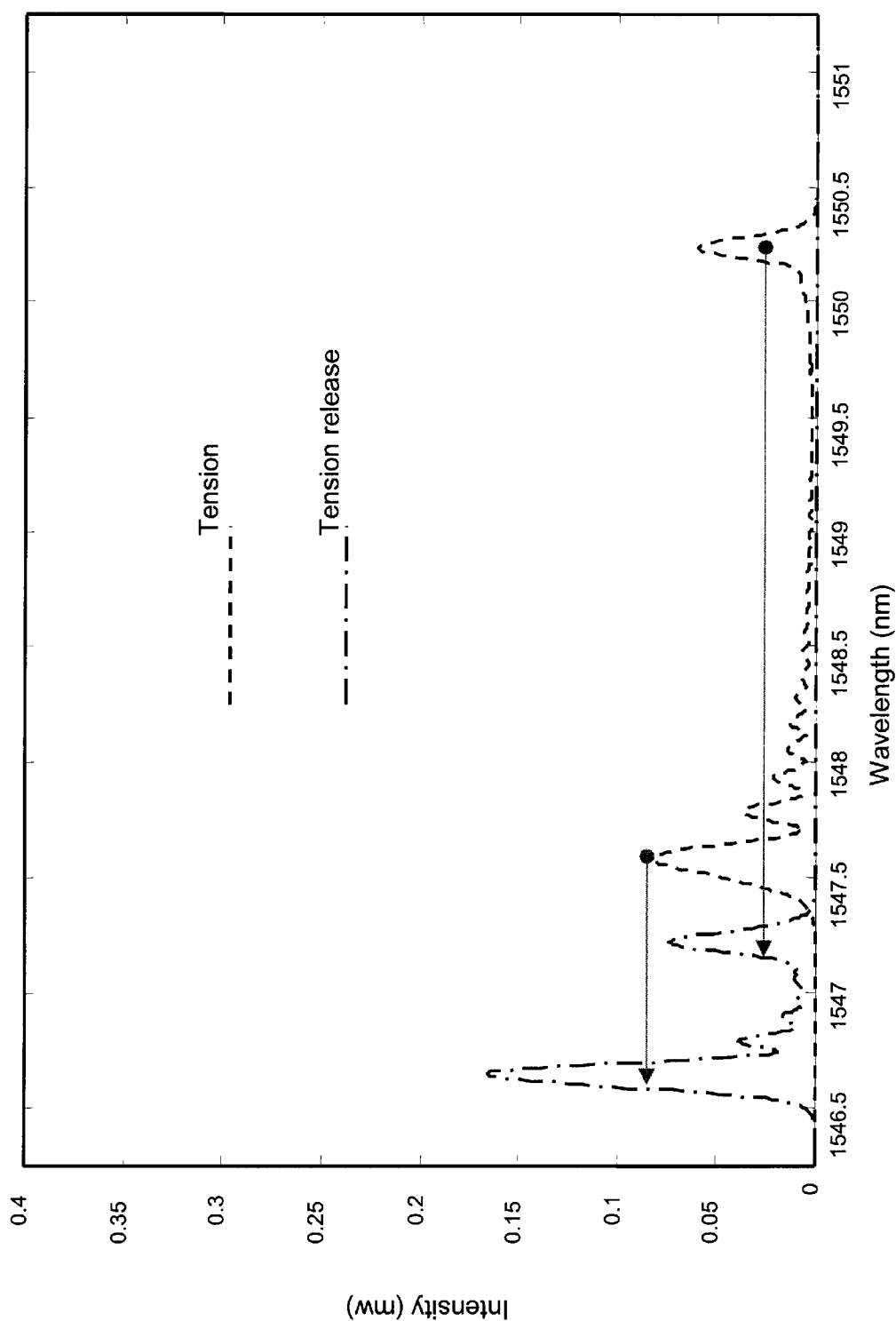
FIG. 6 is a composite graph of intensity versus wavelength illustrating measurements made by the inventive system during axial tension application and after axial tension is released.

FIG. 6 illustrates a graph of intensity versus wavelength measurement for yet another type of condition. Namely, FIG. 6 illustrates the effect on the fiber 10 caused by releasing the tension applied by the tension pull test. The negative peak wavelength shift of the two peaks indicates the tension release. It can also be seen that the split peaks are further apart while the tension is being applied compared with tension release which indicates that the free section 35 experiences a greater tension that the shielded section 30 while tension is being applied. The peaks move closer together after tension release which indicates that the free section 35 and shielded section are still experiencing different stresses but with less of a difference as compared with tension being applied.

Figure 7:
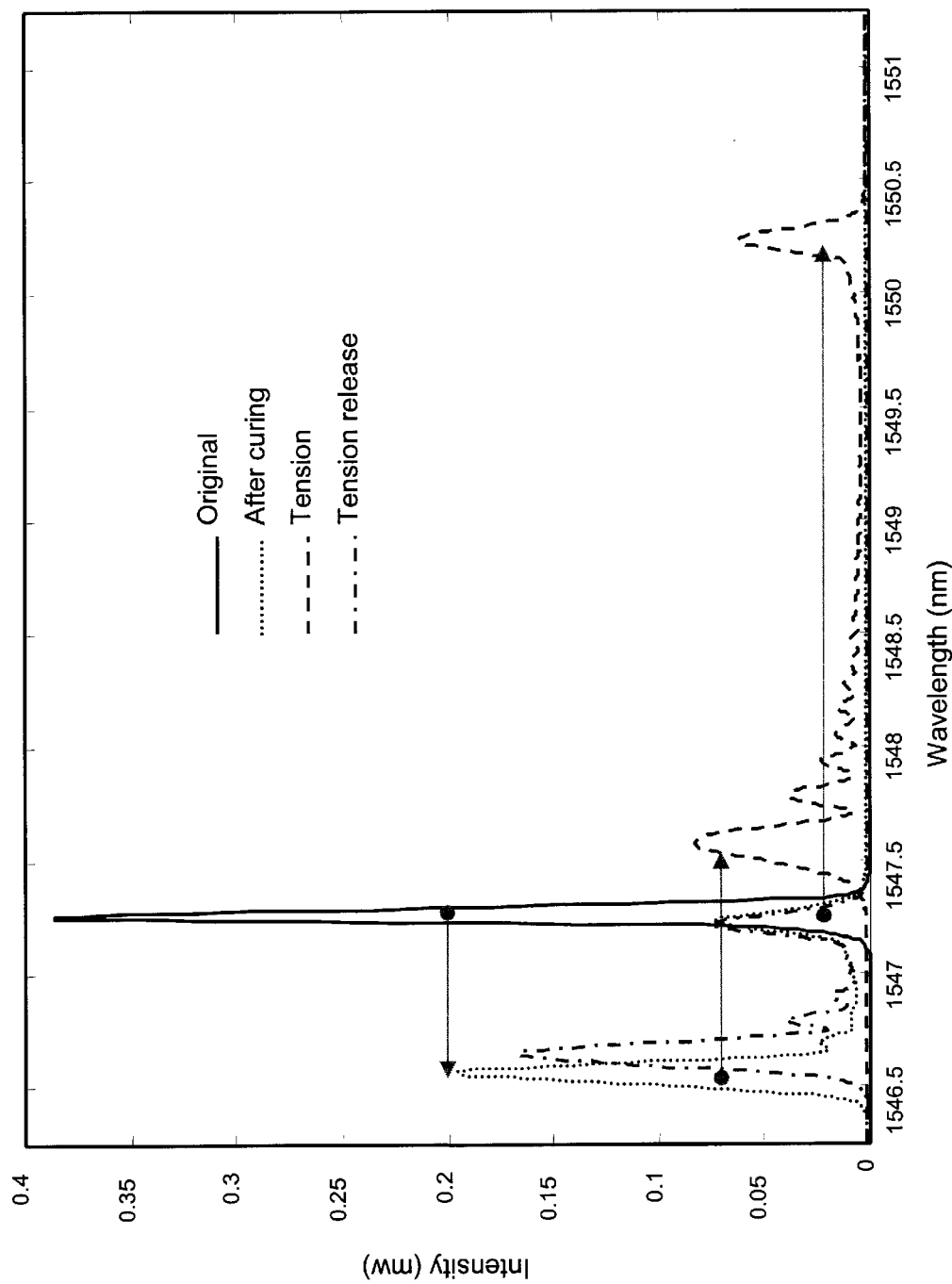
FIG. 7 is a composite graph of intensity versus wavelength illustrating measurements made by the inventive system before and after the fusion splice protector is cured, during axial tension application and after axial tension is released.

FIG. 7 is a composite of the graphs shown in FIGS. 4–6. This composite provides even more information and permits comparison of the splice protector 40 performance over 4 different conditions.

For example, comparing the tension release spectrum to the after curing spectrum in FIG. 7 shows that these spectra are quite similar. Closer examination reveals that the tension release spectrum has a small positive shift relative to the after curing spectrum at the shielded section 30. This small positive shift in spectra may be interpreted as tension-induced residual strain. In other words, following a pull test and after the axial tension P is released the shielded section 30 is still under tension relative to section 30 after curing status and the overall profile shows that the fiber 10 is still in compression a fact heretofore unknown.

In general, FIG. 7 clearly shows that the reflected Bragg spectrum is determined by the strain state along the fiber Bragg grating 20. Unlike a conventional strain gauge that only senses the integral response along the gauge, the inventive arrangement of the fiber Bragg grating 20 turns out to be a very good distributed sensing element.

The interrogation schemes for the inventive distributed sensing techniques, however, are not only limited to these intensity-based methods. For example, the grating strain (or wavelength shift) profile can be interrogated by phase-based measurements using the system 105 of FIG. 3b; by detecting interference fringes with the system 110 of FIG. 3c or by other systems as mentioned above.

Another quantitative measure of the stress applied to the fiber 10 by the splice protector 40 may be calculated according to:

$$\int_{\lambda_{(z=0)}}^{\lambda_{(z=1)}} -\ln[1 - R(\lambda)] d\lambda = \pm \frac{\pi^2}{2} \int_0^l \frac{\Delta n^2(z)}{n(z)} dz, \quad (1)$$

where $R(\lambda)$ is the reflection spectrum of the FBG apparatus 5, $\Delta n(z)$ is the refractive index modulation of the grating 20, n(z) is refractive index of the core of fiber 10, and z is the grating position such that $0 \leq z \leq L$, where L the total grating length. When $\Delta n(z)$ is uniform and the variation of n(z) is negligible which is a safe assumption in most cases, Eq. (1) can be rewritten as $$z(\lambda) = \pm \frac{2n}{\pi^2 \Delta n^2} \int_{\lambda_{(z=0)}}^{\lambda_{(z=L)}} -\ln[1 - R(\lambda)] d\lambda. \tag{2}$$

For a known uniform grating with a grating length of L, Eq. (2) can be rewritten as $$L = \pm \frac{2n}{\pi^2 \Delta n^2} \int_{\lambda_{(z=0)}}^{\lambda_{(z=L)}} -\ln[1 - R(\lambda)] d\lambda. \tag{3}$$

L and $R(\lambda)$ are known such that $2n/\pi^2 \Delta n^2$ can be expressed as $L/\pm\cdot\ln[1-R(\lambda)]d\lambda$. By substituting this expression into Eq. (2), $z(\lambda)$ can be derived. Therefore, an inverse function $\lambda(z)$ can be obtained. A limitation of this approach is that $z(\lambda)$ has to be monotonically varied along $\lambda$ to ensure the inverse function exists. This problem may be solved by using a chirped grating for fiber Bragg grating 20.

To describe the effect on the fiber axial strain, $\epsilon_z^f$, and temperature variation, T, to the wavelength shift for a low-birefringence FBG 20, the wavelength shift-strain-temperature relationship is as follows:

$$\frac{\Delta\lambda}{\lambda_b} = \epsilon_z^f \left\{ 1 - \frac{1}{2} n_0^2 \left[ p_{12} - \frac{1}{2} \upsilon_f(p_{11} + p_{12}) \right] \right\} + \frac{1}{n_0} \frac{\partial n}{\partial T} T \tag{4}$$

where $\Delta\lambda/\lambda_b$ is the normalized Bragg wavelength shift (normalized by $\lambda_b$ which is the Bragg grating 20 center wavelength), $p_{11}$ and $p_{12}$ are Pockels strain-optic constants, $n_0$ is the average refractive index. $\upsilon_f$ is the Poisson's ratio of glass.

Assuming, for example, that $p_{11}$ is 0.113, $p_{12}$ is 0.252, $n_0$ is 1.45, and $\upsilon_f$ is 0.16, $\{1-0.5~n_0^2[p_{12}-0.5\upsilon_f(p_{11}+p_{12})]\}$ is then equal to 0.77. In an isothermal condition, Eq. (4) can br simplified to $$\frac{\Delta\lambda(z)}{\lambda_b} = 0.77\epsilon_z^f(z) \tag{5}$$

One can obtain $\Delta\lambda(z)/\lambda_b$ on the left-hand side of Eq. (5) by subtracting the inverse function $\lambda(z)$ derived from Eq. (3) and normalized by $\lambda_b$ at two different loading conditions. Therefore, axial strain $\epsilon_z^f(z)$ along the grating depth z can be derived.

In the alternative phase measuring system 105, $z(\lambda)$ can be obtained with the following formula and utilizing the $\phi(\lambda)$ measurements made by system 105:

$$-\frac{d\phi}{d\lambda} = \frac{4n_c\pi}{\lambda_c} z(\lambda) \tag{6}$$

Once $z(\lambda)$ is obtained, then Equations (4) and (5) may be applied in a similar fashion to that described above.

Figure 8:
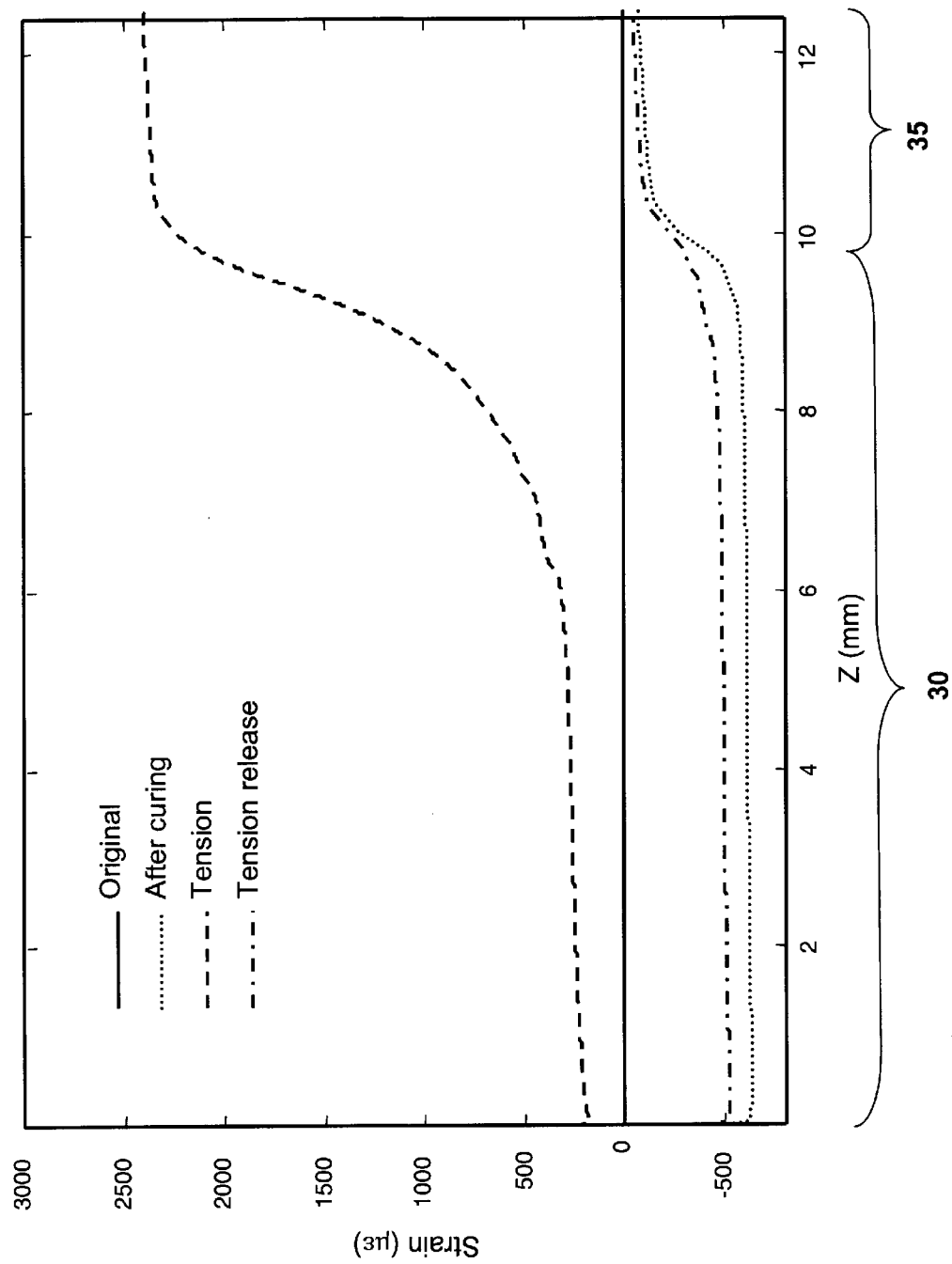
FIG. 8 is a composite graph of strain versus axial distance illustrating calculation results of measurements made by the inventive system before and after the fusion splice protector is cured, during axial tension application and after axial tension is released.

The traces shown in FIG. 8 are obtained using the raw data in FIG. 7 and the discussions from Eqs. (2) through (5).

FIG. 8 shows the result of these calculations in the form of a graph of strain versus distance. In this graph, distance Z is measured starting from the end (as shown in FIG. 1 the leftmost end) of Bragg grating 20 which is preferably provided in the center of splice protector 40 as mentioned above. As is readily apparent from FIG. 8, the shielded section 30, experiences much less strain that the free section 35. The distribution of the strain increase also provides important information as to just how effective the splice protector 40 is in relieving tension and at what axial point will the strain fall below an acceptable threshold.

FIG. 8 also reveals the residual stress on both the free section 35 and shielded section 30 after the tension is released. This residual stress differs from the stress applied by curing the splice protector which indicates the ability of the splice protector 40 and fiber 10 to recover from the tension once it is released. Moreover, the effect of curing the splice protector can also be quantitatively measured across the free and shielded sections 35, 30.

Summarizing the testing and calculation results (FIGS. 4–8) for the first splice protector sample: after curing the shielded section 30 inside the protector has a −0.6 nm shift which corresponds to a −5 kpsi compression relative to the original (before curing). In the tension condition, the $\Delta\lambda/\lambda_b$ for the free section 35 is 3.5 times the $\Delta\lambda/\lambda_b$ of the shielded section 30. After tension release, the shielded section 30 has a slightly positive shift due to a residual strain from the tension.

The application of a normalized wavelength shift ($\Delta\lambda/\lambda_b$) is quite useful particularly because it is not necessary or relevant to specify the original wavelength reflected by the fiber Bragg grating 20. The original wavelength shown in the figures was chosen merely because that particular fiber Bragg grating design was readily available to the inventors. Thus, normalizing the wavelength shift by the original Bragg wavelength $\lambda_b$ is particularly advantageous.

As indicated by the graphs of FIGS. 4–8, the invention is quite useful for studying the stresses applied by a splice protector 40 on a fiber 10 under various conditions. Comparative studies that compare one splice protector to another are another example of the invention's utility.

Figure 9:
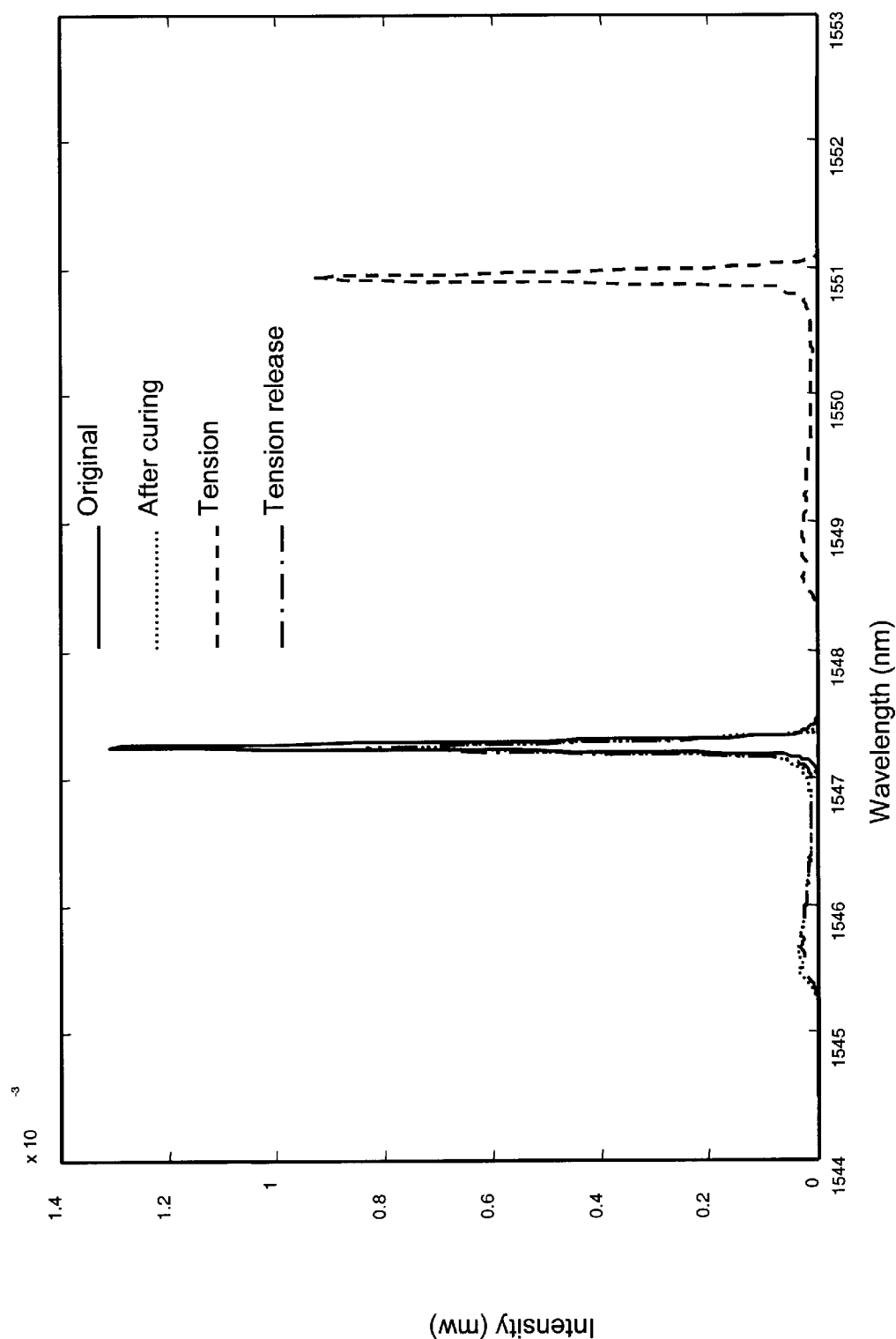
FIG. 9 is a composite graph of intensity versus wavelength for a second splice protector sample different than the sample whose test results are shown in FIGS. 4–8 and further illustrating measurements made by the inventive system before and after the second fusion splice protector is cured, during axial tension application and after axial tension is released.

FIG. 9, for example, illustrates the results of testing another splice protector different than the one whose test results are shown in FIGS. 4–8. FIG. 9 is a composite graph showing intensity versus wavelength for the second sample (splice protector) for original (no stress, not cured), after curing, during axial tension application, and after tension release.

Figure 10:
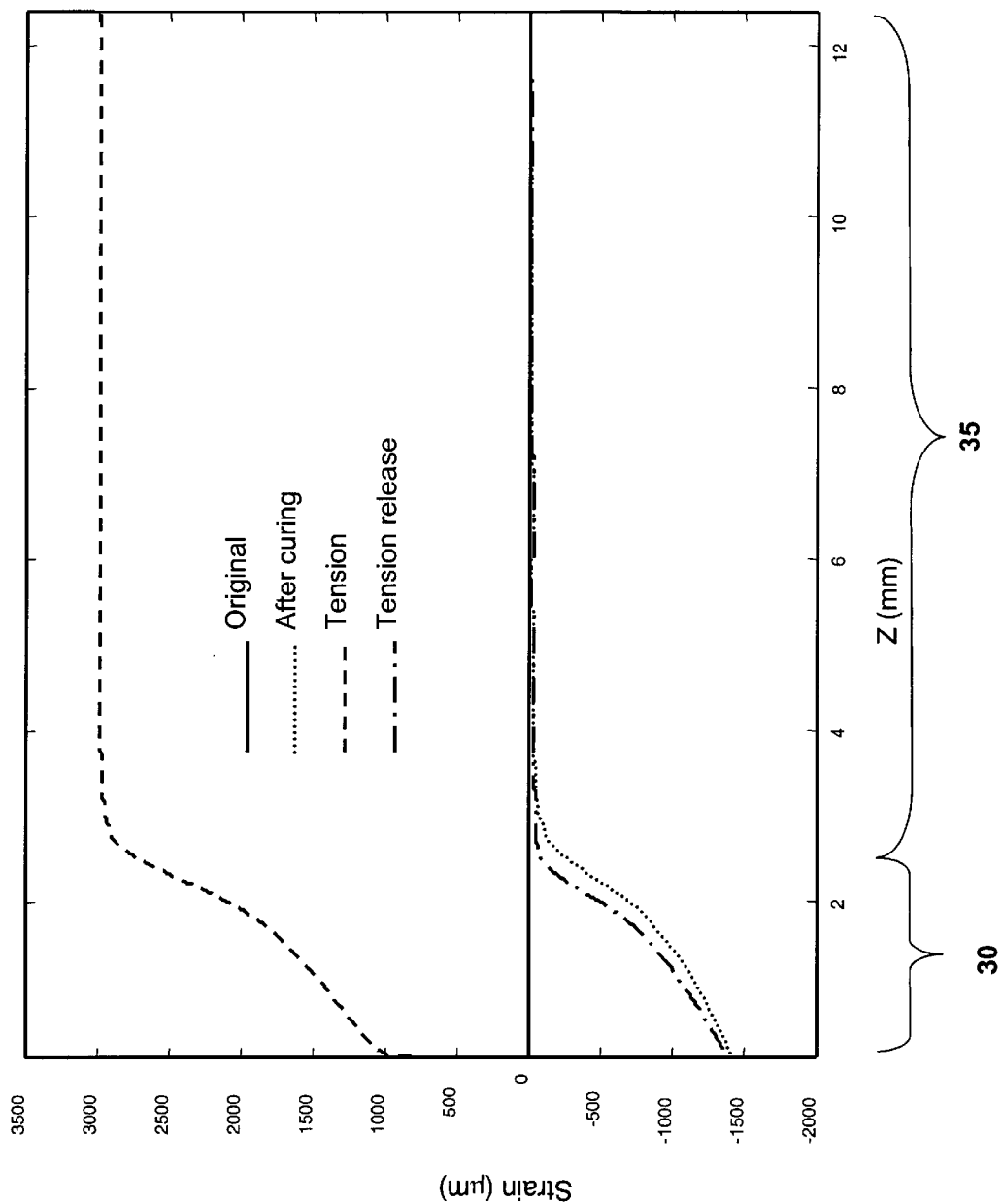
FIG. 10 is a composite graph of strain versus axial distance illustrating calculation results of measurements made by the inventive system before and after the second fusion splice protector is cured, during axial tension application and after axial tension is released.

FIG. 10 shows calculation results based on the FIG. 9 data for the second splice protector sample in the form of strain versus axial distance.

Interpreting the testing and calculation results of the second sample reveals that after curing the fiber 10 inside the splice protector 40 (the shielded section 30) has a −1.6 nm shift corresponding to a −13 kpsi compressive strain relative to the original (before curing). In the tension condition, the $\Delta\lambda/\lambda_b$ for the free section 35 is 1.2 times the $\Delta\lambda/\lambda_b$ of the shielded section 30. After tension release, the shielded section 30 has a slightly positive shift due to a residual strain from the tension.

By comparing the first and second splice protector sample measurements and calculations, one can judge which is the better protector. The first sample places less compressive stress on the fiber when cured (−5 kpsi versus −13 kpsi). During tension, the first sample protects the fiber inside the splice protector better than the second sample (3.45 times wavelength shift as compared to 1.2 times wavelength shift).

Figure 11:
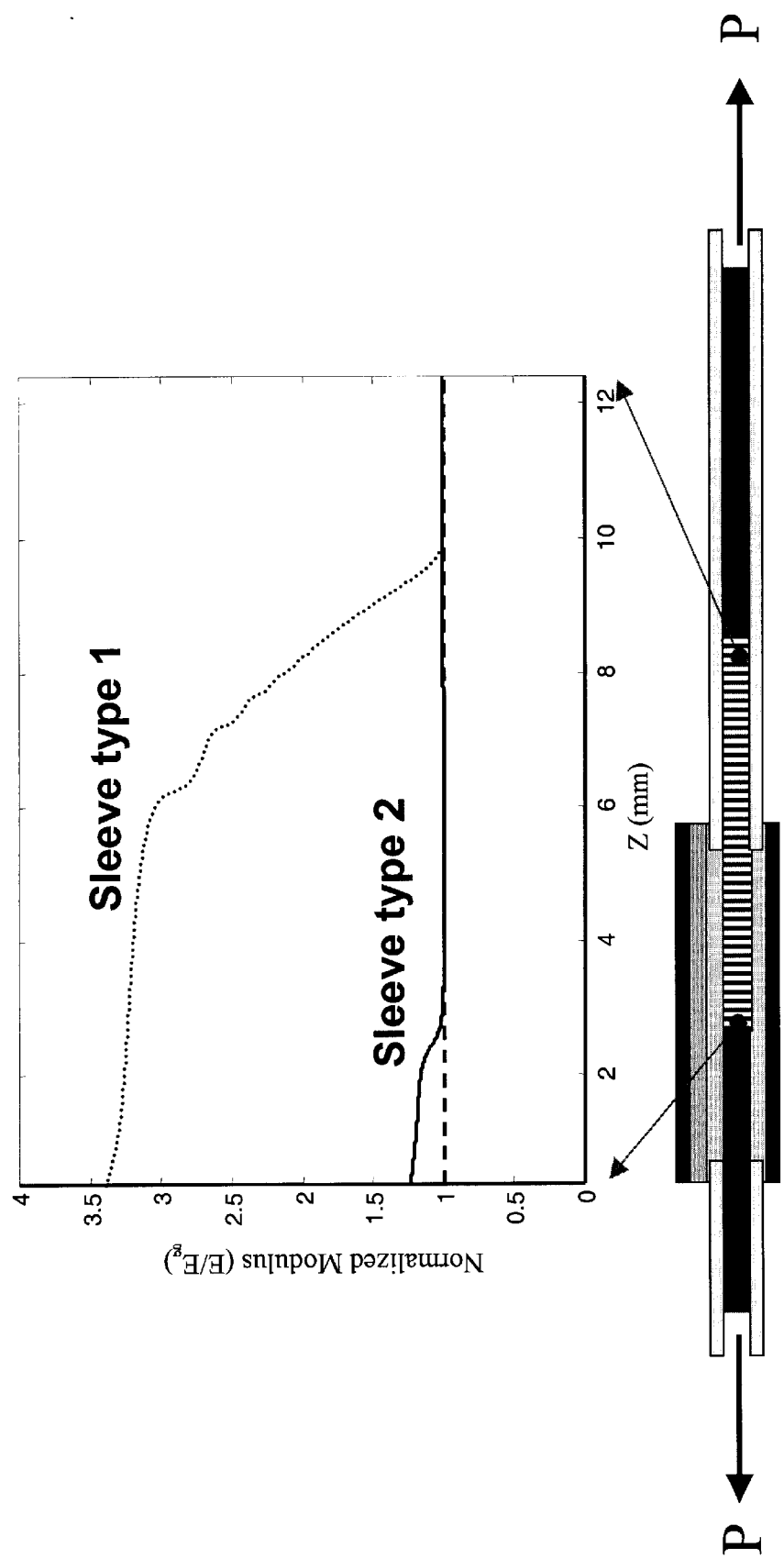
FIG. 11 is a comparison graph charting normalized modulus versus distance for two different types of fusion splice protectors (sleeve 1 and sleeve 2) measured by the inventive system and showing the Z axis relative to the axial dimension of the FBG apparatus 5.

FIG. 11 illustrates another comparison of the two types of splice protectors (sleeve type 1 and sleeve type 2). FIG. 11 is a plot of the normalized modulus versus axial distance for the two type of splice protectors. FIG. 11 also shows the inventive apparatus 5 relative to the axial distance axis Z to further illustrate the distributed sensing being performed by the invention.

FIG. 11 reveals that for a fixed stress, the composite modulus in the shielded section 30 is higher than the fiber modulus in the unshielded section 35. This difference may be explained by Hooke's law in that the stress is directly proportional to strain as $\sigma_z = E\epsilon_z$ where $\sigma_z$ is the stress in z direction, E is the material modulus and $\epsilon_z$ is the strain in z direction. The strain profiles for two different splice protectors 40 have been shown in FIGS. 8 and 10. Therefore, the modulus E along he axial (z) direction of grating 20 can be obtained by the following expression:

$$E(z) = \frac{\sigma_z}{\varepsilon_z^f(z)}, \quad (6)$$

For comparison, one may normalize the composite modulus $E_z(z)$ by the fiber modulus $E_g$ which is a constant (e.g. ~70 GPa for the sample tested) and given by $E_g = \sigma_z / \epsilon_z(L)$. Thus, one can simply use this expression to normalize Eq. (6) without bothering to measure $\sigma_z$.

By comparing the two traces shown in FIG. 11, one can see that both sleeves 40 have a shallower slope of normalized modulus gradient near the center, but a steeper slope near at the edge of the sleeves. This indicates that the splicing spot should be placed near the center of the sleeve 40 to ensure the maximum strain-relief capability by the sleeve 40. The graph also shows that sleeve type 2 (without steel member) has a shorter grating length shielded by the sleeve compared to sleeve type 1 (with steel member) due to improper preparation, i.e. the left end of the grating 20 is not at the center of the sleeve 40.

However, this improper preparation does not affect the earlier discussion simply because the modulus gradient near center is nearly flat. In other words, the splice spot only needs only to be placed near the center but does not to be precisely placed in the exact center in order for the fiber 10 to experience a better strain-relief. As discussed above, sleeve type 1 places less compressive stress on the fiber 10 when cured (−5 kpsi versus −13 kpsi) but possesses higher reinforcement (3.45 versus 1.2) compared to sleeve type 2. Therefore, sleeve type 1 is preferred over sleeve type 2 for the aging test because it is less sensitive to environmental perturbation.

Another condition that the fiber 10 may be subjected to is aging. The effect of aging on the splice protector 40 and fiber 10 is another important phenomenon that may be measured and analyzed by using the invention. To conduct aging tests, the invention may utilize the environmental chamber 75 shown in FIG. 3. For example, the controller 70 may command the environmental chamber 75 to raise the internal temperature thereof in order to accelerate the aging of FBG apparatus 5. Of course, a manual control of environmental chamber 75 may also be used.

Figure 12:
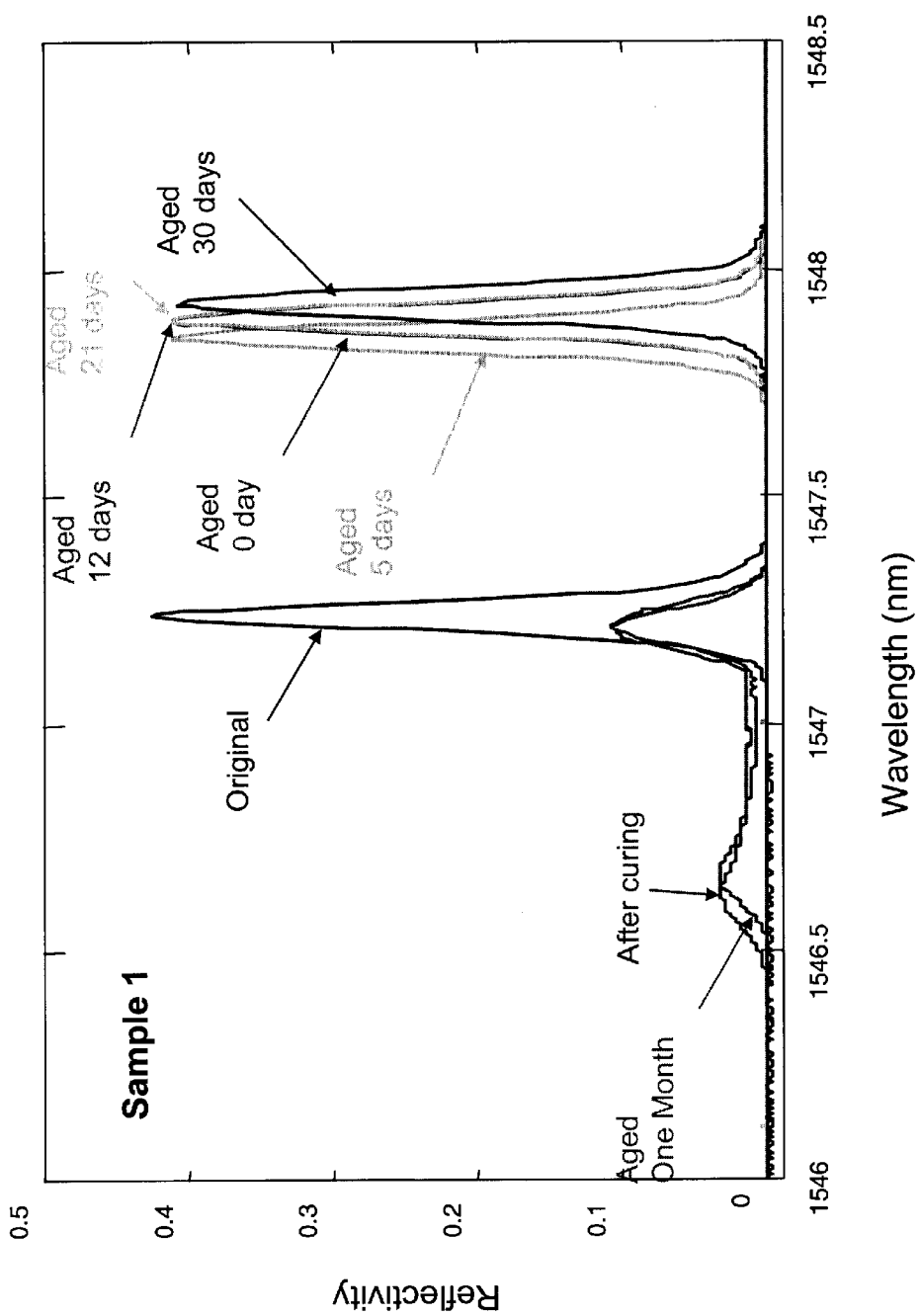
FIG. 12 is a composite graph of reflectivity versus wavelength according to the invention for a first sample (splice protectors) at various stages of aging.

FIG.12 shows the results of such age-acceleration which is another one of the changing conditions that the FBG apparatus 5 may be subjected to. Various measurement curves are shown in FIG. 12 including an age acceleration of zero day, five days, twelve days, twenty-one days and thirty days. The "aged one month" curve shows the result after the FBG apparatus 5 is removed from the environmental chamber 75 that simulated aging of one month. The age-accelerated curves are affected by the heat of the environmental chamber and are wavelength shifted by this heat.

Figure 13:
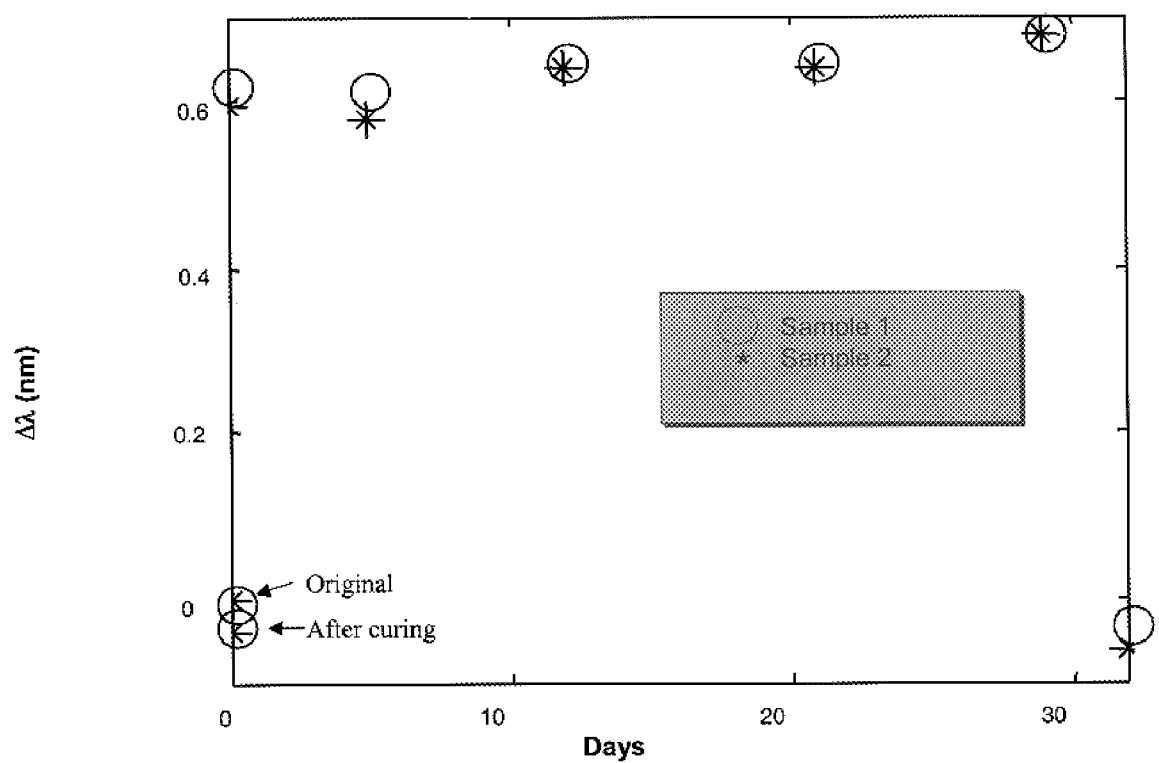
FIG. 13 is a comparison graph according to the invention showing the wavelength change versus time for two different samples (splice protectors)

FIG. 13 shows the normalized wavelength shift as a function of time for two different samples.

Since the wavelength shifts of the two grating samples were dominated by the thermal effect in the aging chamber, the original peak wavelength was subtracted from the major peak wavelengths measured in different conditions. The results are shown in FIG. 13.

As shown in FIG. 13, at Day 0, there is slight negative shift (−30 pm) which may be attributed to the temperature variation at the environmental chamber 75. After the samples were placed in the chamber 75, the chirp in the grating 20 due to strain gradient imposed by the shrink sleeve 46 is negligible because the thermal expansion of the shrink sleeve 46 does not compress the shielded section 30 of fiber 10 any more. The shift of the grating peak is mainly due to dn/dt effect as shown in Eq. (4).

The thermal sensitivity of grating 20 is about 0.106 nm/° C. and the temperature difference between room temperature (25° C.) and aging chamber (85° C.). Therefore, the wavelength shift due to thermal effect is about 0.63 nm. FIG. 13 shows the major peak wavelengths rising from −0.03 nm to ~0.6 nm a result that agrees with the calculation.

FIG. 13 also shows clearly that in the aging test Day 30 has a slightly higher wavelength shift than the shift at Day 0 with about 0.05 nm difference. This difference may be attributed to the contribution of creep from the adhesive and shrink tube 46, and the variations of environment.

After the aging test, the major and minor peaks seen after curing still were preserved, indicating that the temperature and humidity effects from the aging chamber 75 did not degrade the sleeve 40 performance significantly.

Figure 14:
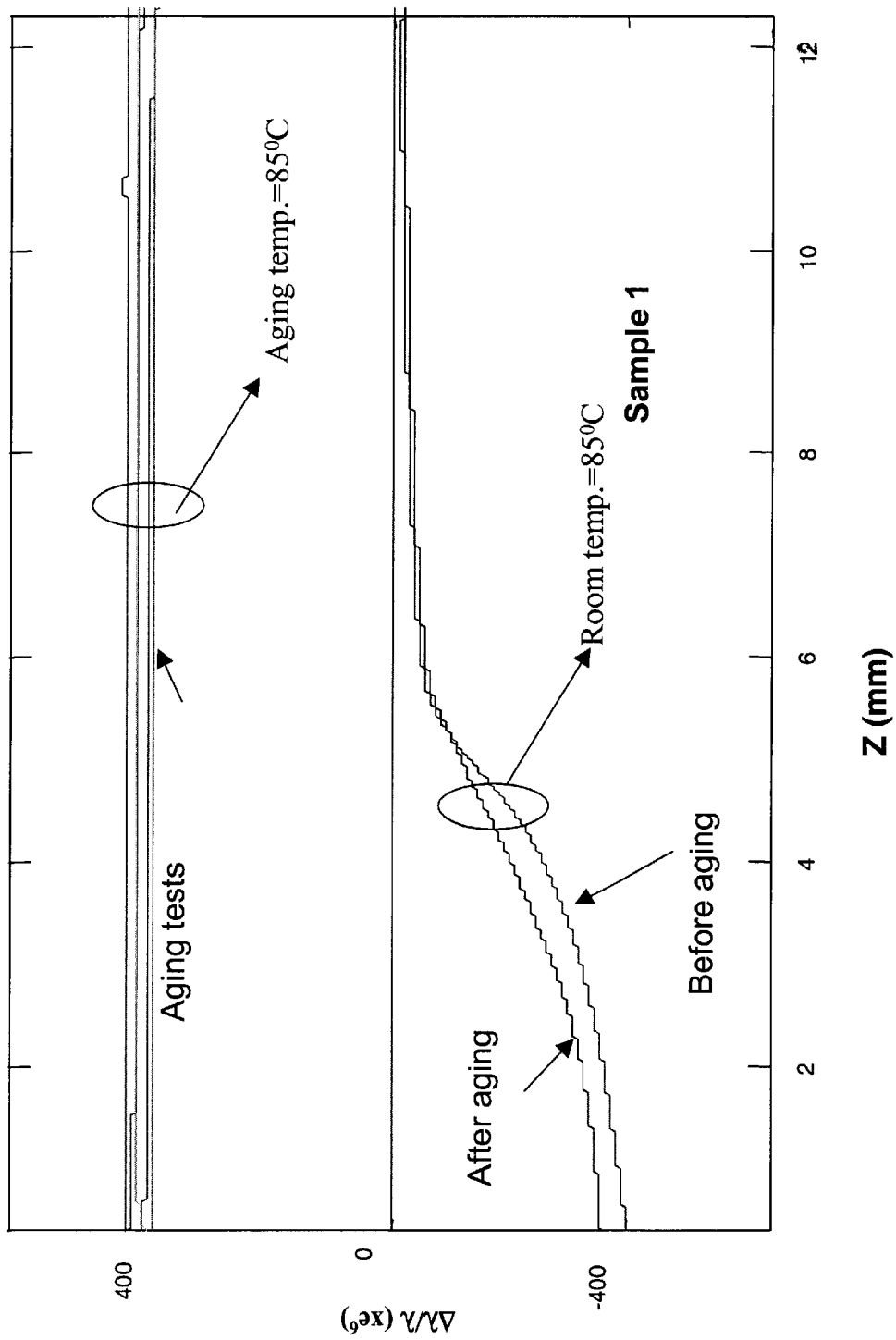
FIG. 14 is a composite graph of normalized wavelength shift versus distance according to the invention for the first sample at various stages of aging.

FIG. 14 shows the results of aging for the first splice protector sample (sample 1) in the form of normalized wavelength shift versus axial distance for the first sample at various stages of aging.

Similar to the discussions above in relation to FIGS. 8 and 10, FIG. 14 shows grating position vs. normalized wavelength shifts for sample 1 using the arguments from Eq. (2) through Eq. (5). In addition, sample 2 has similar results as sample 1. The difference is that only strain perturbation was imposed on the samples as shown in FIGS. 8 and 10, but strain and temperature perturbation were imposed on sample 1 as shown in FIG. 14. Therefore, the normalized wavelength shift was used as y-axis label in the graph. FIG. 14 also shows that the negative wavelength shifts due to compression inside the sleeve are negligible due to the elevated temperature in the aging chamber 75.

In the aging tests, the wavelength is slightly shifted but still uniform along the grating 20 length, indicating that the compression occurred on the fiber 10 inside the sleeve 40 (the shielded section 30) relative to the fiber outside the sleeve (free section 35) in the room temperature condition does not exist in aging temperature condition. This is due to thermal expansion of the shrink tube 46 in radial direction that relaxes the compression to the shielded fiber 30.

Figure 15:
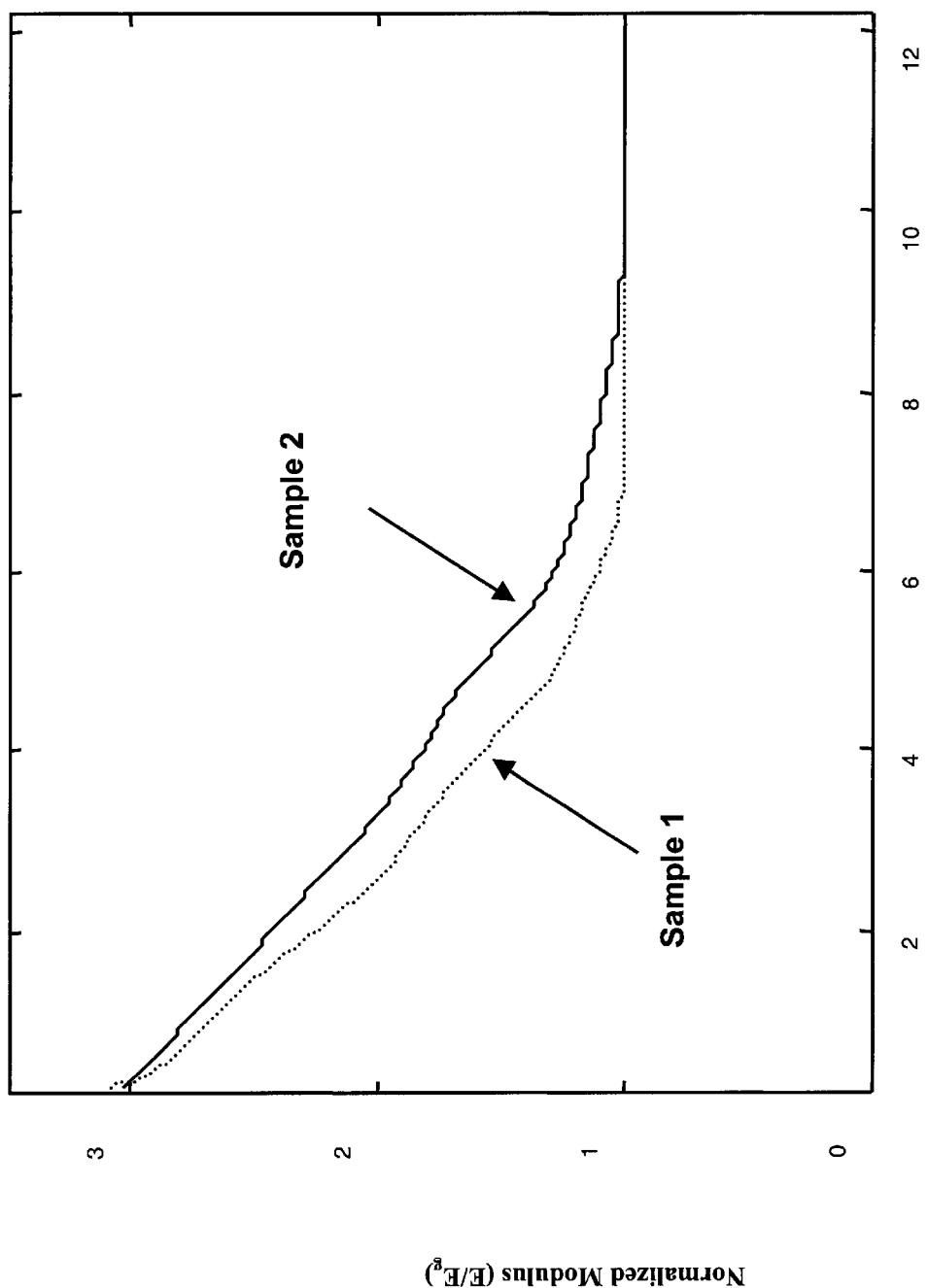
FIG. 15 is composite graph of normalized modulus versus distance according to the invention for two different samples.

Another example of how different splice protectors may be compared against each other is shown in FIG. 15 which is a graph of normalized modulus versus axial distance. Similar to FIG. 11, the normalized modulus vs. grating penetrated length is obtained based upon the discussion in Eq. (6). By comparing FIG. 11 and FIG. 15, one can see that the aging test seems to slightly degrade the reinforcement performance. This conclusion is based upon the observations that the normalized modulus is reduced from 3.45 to 3, and normalized modulus is less uniform for the region near the center of the sleeve 40, indicating that the shear strain provided by the adhesive degraded due to the aging test.

Figure 16:
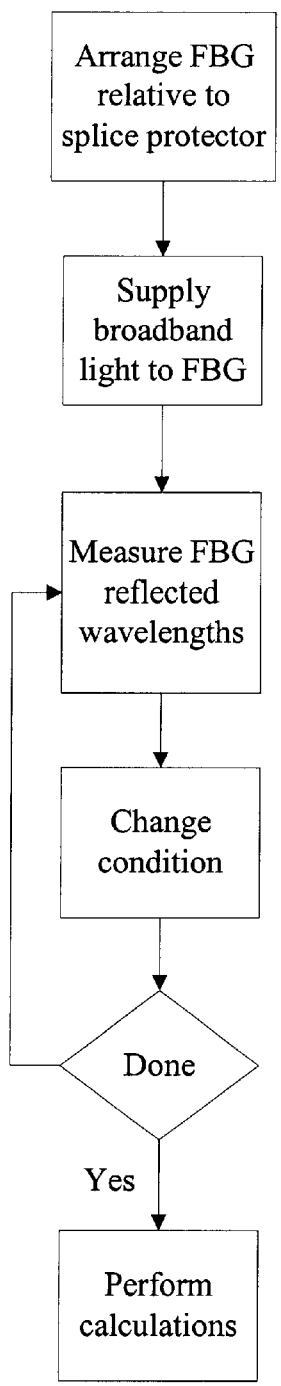
FIG. 16 is a high-level flowchart illustrating the inventive methods.

FIG. 16 is a high-level flowchart of the inventive methodology. The inventive method includes arranging the fiber Bragg grating (FBG) apparatus 5 relative to the splice protector 40. This step preferably includes axially arranging the FBG 20 relative to the splice protector 40 such that the shielded section 30 extends approximately half-way into the splice protector 40.

Once arranged in this fashion, the method may then continue by supplying broadband light to the FBG 20. The shielded 35 and free 30 sections of the FBG 20 will then reflect wavelengths of light. If the stresses applied to the shielded 35 and free 30 sections differ, then different wavelengths will be respectively reflected.

A measurement is then taken of the reflected wavelengths. This may be done by the measuring instrument 60 that measures at least two different wavelengths reflected by the FBG 20 and, preferably, measures a spectrum of wavelengths. These measurements may then be displayed on a printer/plotter 95 or other display device either directly by the measuring instrument 60 or via the controller 70.

After taking a measurement, the invention may then change a condition. Changing a condition encompasses changing a wide variety of variables such as curing the splice protector (e.g. measure before and after splice protector 40 is cured); applying an axial tension load (e.g. with the fiber tensioner shown in FIG. 3); releasing an applied axial tension load; the passage of time; age acceleration (e.g. with the environmental chamber 75) or any other variable that may affect the stress applied to the optical fiber 10.

The invention then enters a decision mode to decide whether the current iteration of the process is done. For example, the condition may need to be changed again or another condition changed so that a broader array of measurements may be taken such as successive aging tests or switching from splice protector curing to application/release of an axial tension load.

Another example of deciding whether the process is done is when the fiber tensioner successively applies great amounts of axial tension load to the fiber. At each iteration, the axial tension load may be increased and a measurement taken. Iterating these steps will produce a performance profile that shows the performance of the splice protector 40 as it is subjected to increasing amounts of axial tension load.

Calculations may also be performed as further indicated by FIG. 16. For example, any of the calculations described above may be performed by the controller 70 and the results internally stored or fed to an output device such as printer/plotter 95 or display device 90. The calculation step need not strictly follow the iterative loop shown in FIG. 16 as some calculations require only one measurement.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An apparatus for comparing tensile or compressive stresses imposed on different parts of an optical fiber by a package, comprising:

a fiber Bragg grating provided in the optical fiber;

a free section of said fiber Bragg grating, said free section protruding from the package;

a shielded section of said fiber Bragg grating, said shielded section being shielded by the package, wherein said free section of said fiber Bragg grating provides a measurement reference with respect to said shielded section of said fiber Bragg grating.

2. The apparatus as recited in claim 1, said shielded section of said fiber Bragg grating being arranged relative to the package such that said shielded section experiences approximately half of a stress profile within the package.

3. The apparatus as recited in claim 1, wherein said fiber Bragg grating has a length sufficient to and is axially arranged relative to the package such that said shielded section of said fiber Bragg grating extends approximately halfway into the package.

4. The apparatus as recited in claim 1, wherein said fiber Bragg grating is a chirped grating.

* * * * *